United States Patent [19]

Köhler et al.

[11] Patent Number: 4,607,419

[45] Date of Patent: Aug. 26, 1986

[54] ALTERNATOR APPARATUS

[76] Inventors: Gustav Köhler, Blomvägen 3; Mikael Köhler, Skräddaregatan 39; Ulf Köhler, Industrigatan 4, all of S-430 10 Tvååker, Sweden

[21] Appl. No.: 688,392

[22] Filed: Jan. 2, 1985

[30] Foreign Application Priority Data

Jan. 10, 1984 [SE] Sweden ............................... 8400094

[51] Int. Cl.[4] ............................................. B23P 19/04

[52] U.S. Cl. ..................................................... 29/24.5

[58] Field of Search ......................... 242/197, 200, 55; 29/24.5, 8.09

[56] References Cited

U.S. PATENT DOCUMENTS 2,917,810 12/1959 Wilson ................................ 29/24.5
3,878,596 4/1975 Iwai ...................................... 29/809
4,222,166 9/1980 Kurek .................................. 29/809
4,420,862 12/1983 Edixhoven .......................... 29/24.5

FOREIGN PATENT DOCUMENTS 745639 7/1980 U.S.S.R. .............................. 29/24.5

*Primary Examiner*—Mark Rosenbaum
*Assistant Examiner*—Steven Nichols
*Attorney, Agent, or Firm*—Beveridge, DeGrandi & Weilacher

[57] ABSTRACT

The disclosure relates to a slat alternation apparatus in a machine for the manufacture of venetian blinds and the like, for optional alternation of slat belts (2–6) of different colors during the manufacture of a venetian blind, a magazine (1) with a number of different slat belts (2–6) being laterally shiftable at the infeed end of the machine, for positioning of the desired slat belt (2–6) in a position for infeed into the machine.

13 Claims, 3 Drawing Figures

ALTERNATOR APPARATUS

TECHNICAL FIELD

The present invention relates to an apparatus in a machine for the manufacture of venetian blinds and the like, in which slats are holepunched, cut and passed into cord ladders, for the optional alternation of slat rows of different types, eg, different colours.

BACKGROUND ART

In recent years, desires have been voiced for venetian blinds with differently coloured slats for realizing different colour patterns and colour combinations in each individual venetian blind. Thus, it may be desirable, in one and the same venetian blind, to have a plurality of identical and/or different width fields with slats of different colours. For producing such a venetian blind in a per se known machine, it is necessary manually to change the slat belts, which entails a considerably longer manufacturing time and, thereby, a drastic increase in production costs. Hence, there is a need in the art for an apparatus for the automatic alternation or changing of slat belts in a venetian blind producing machine.

OBJECT OF THE INVENTION

The task of meeting the above-mentioned need forms the basis of the present invention.

SOLUTION

This task is solved according to the present invention in that the apparatus disclosed by way of introduction is provided with a magazine with a number of different slat belts at the infeed end of the machine and that means are provided for switching the magazine for positioning desired slat belts in location for infeed into the machine. The magazine is disposed on rails extending transversely of the machine and is shiftable thereon by means of a piston and cylinder assembly to and from a slat infeed position in register with the infeed rollers of the machine. The magazine is provided with a number of slat belt rolls disposed in side-by-side relationship, the belt ends thereof being fixedly clamped between a clamping roller and a guide roller in such a manner that each belt end is free and grippable by means of the infeed rollers in the slat infeed position. The guide roller displays a groove for each slat belt and the clamping roller has a clamping or braking shoe for each groove and slat and for urging the slat belt against the bottom of the guide groove in the clamping or braking position. The clamping or braking shoe consists of a disk journaled on an excentric shaft and spring-loaded towards its clamping or braking position. The infeed rollers consist of a motor-driven roller and an urging roller which is arranged to urge the slat belt against the periphery of the driven roller for feeding the slat belt into or out of the machine. The urging roller is mounted on a pivotal arm which is switchable by means of a piston and cylinder assembly between a free position and a drive position. The piston and cylinder assembly is arranged, simultaneously with switchings of the arm to the free position, to switch the braking or clamping shoe to the clamping and braking position, and vice versa, so that the slat belts are braked or fixedly clamped partly outside the infeed position and partly when the urging roller is in the free position.

As a result of an apparatus according to the present invention, it is possible, in one and the same venetian blind producing machine, to manufacture venetian blinds with different-coloured slats in an extremely reliable and simple manner, whereby manufacture of the venetian blind may proceed without any unnecessary and costly machine down-time. The apparatus according to the present invention also permits automatic shifting or alternation of slat belts in accordance with any desired pattern card or the like. Thus, an apparatus according to the present invention makes for the manufacture of a venetian blind with fields of different coloured slats without any manual operations whatsoever.

BRIEF DESCRIPTION OF THE ACCOMPANYING DRAWINGS

The invention will now be described in greater detail below, with particular reference to the accompanying Drawings, in which.

DESCRIPTION OF PREFERRED EMBODIMENT

Figure 1:
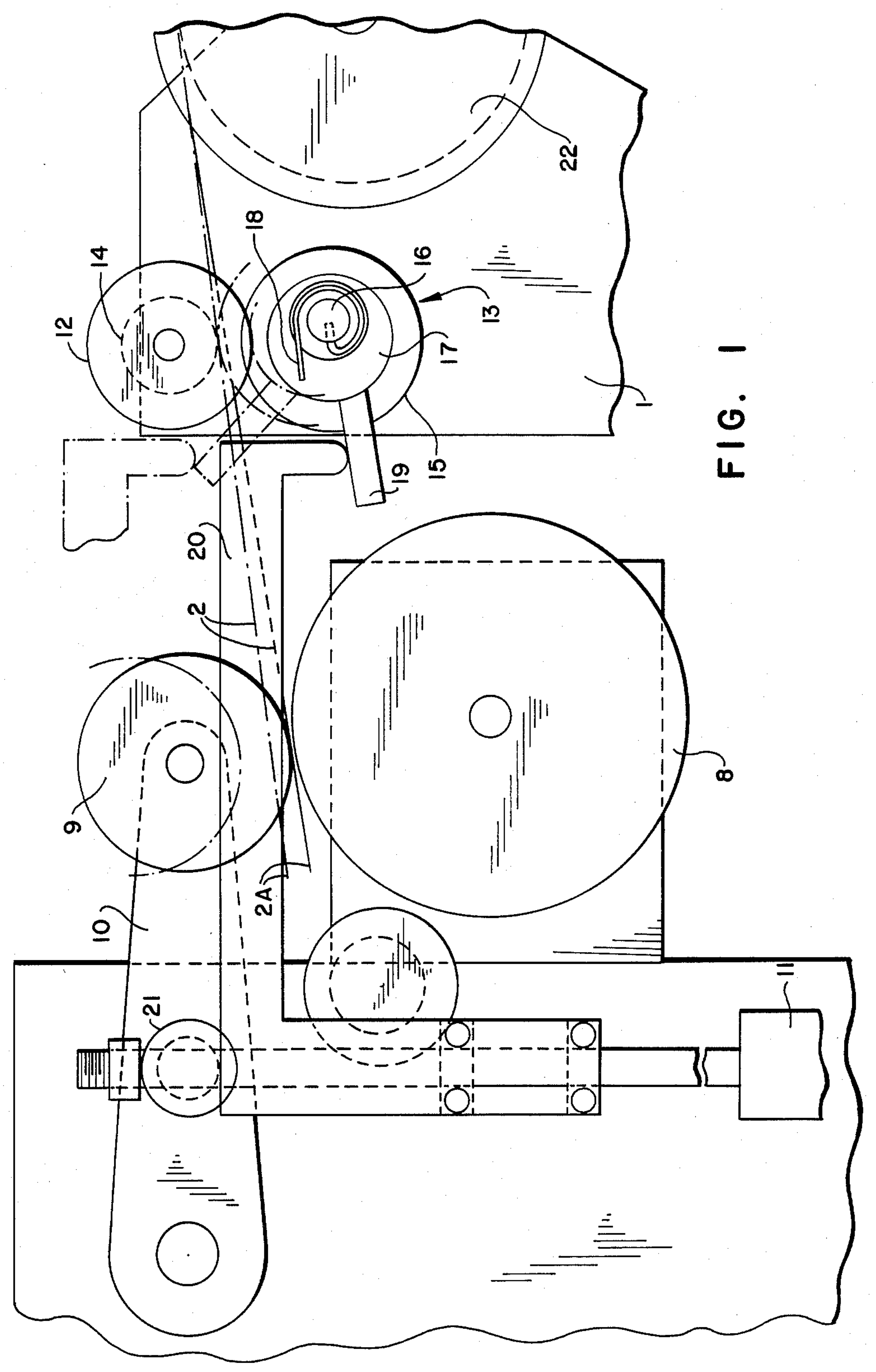
FIG. 1 is a schematic side elevation of parts of a block diagram of an apparatus according to one embodiment of the present invention.
Figure 3:
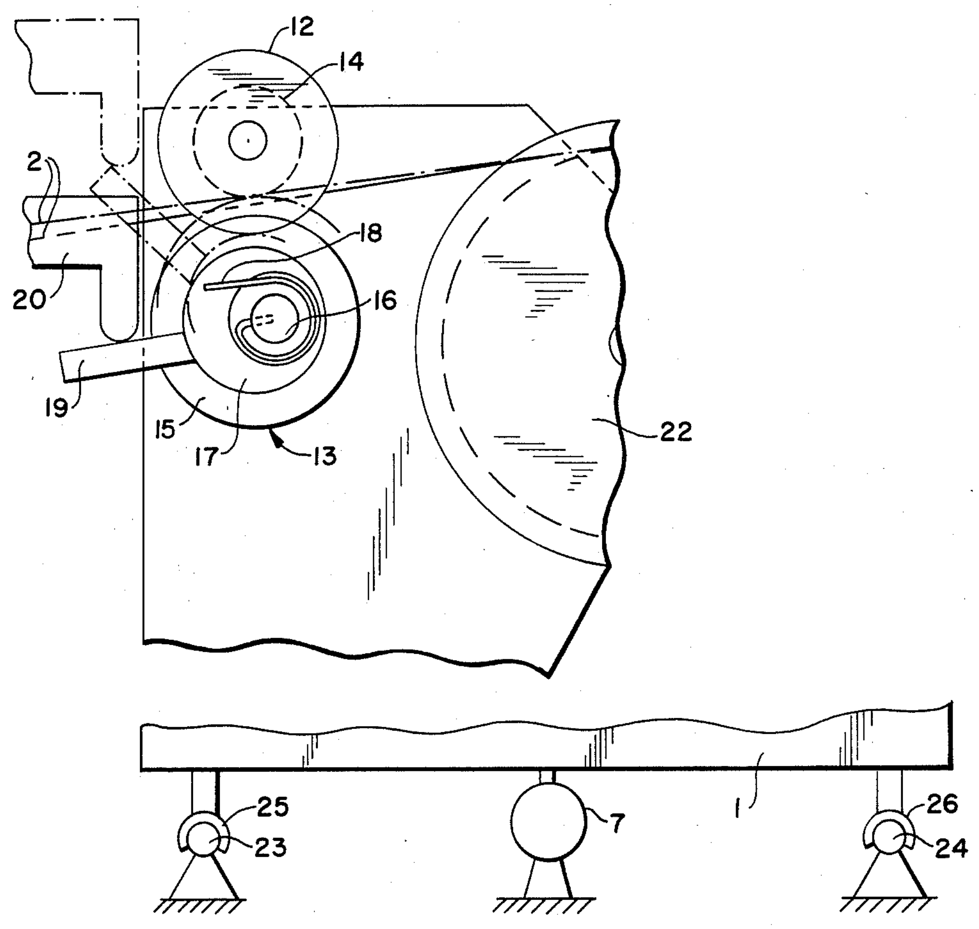
FIG. 3 is a side elevation of a further part of the apparatus shown in FIGS. 1 and 2.

The Drawings show only those parts which are necessary for clarifying the nature of the present invention and its aspects. In a magazine 1, there are disposed five rolls with slat belts 2, 3, 4, 5, and 6 of different colours. The magazine 1 is coupled to a piston and cylinder assembly 7 for movement thereof to and from an infeed position in register with a feeding or drive wheel 8 in the venetian blind producing machine proper. In FIGS. 1 and 3, the magazine 1 is shown in a position with one of the slat belts 2–6 in register with the feeding wheel 8 and, thus, ready for infeed of the belt into the machine.

For moving the slat belt into and out of the machine, the feeding wheel 8 cooperates with an urging roller 9. The urging roller 9 is rotatably journaled on a pivotal arm 10 which is switchable for urging the roller 9 towards the periphery of the feeding wheel 8 and for clamping the slat belt between the urging roller 9 proper and the feeding wheel 8, for passing the slat belt into or out of the machine. The pivotal arm 10 is switchable by means of a piston and cylinder assembly 11.

In the magazine 1, there are disposed a guide roller 12 and a braking or clamping roller 13. The guide roller 12 is provided with a groove 14 for each slat belt 2–6 and the clamping or braking roller 13 is provided with a clamping or braking shoe 15 for each guide groove 14 for clamping or braking the slat belt 2 against the bottom of the guide groove 14. The clamping or braking shoe 15 consists of a circular disk which is excentrically disposed on a shaft 16. The disk 15 is machined on a cylinder 17 which displays an excentrically placed hole (not shown) for the shaft 16. Between the shaft 16 and the cylinder 17, there is disposed a spring 18, whose one end is fixedly anchored in the shaft 16 and whose other end is fixedly anchored in the cylinder 17. The spring 18 is so arranged as to pivot the cylinder 17 with the disk 15 clockwise in FIGS. 1 and 3, so that the periphery of the disk 15 will come into abutment against the bottom of the groove 14. Thus, a slat belt 2 placed between the two surfaces will be fixedly clamped therebetween with the free end 2A of the belt in the desired position (shown by ghosted lines in FIGS. 1 and 3). For releasing the slat belt 2, there is fixedly disposed on the cylinder 17 a radially extending pin 19, by means of which the cylinder 17 and the disk 15 are pivotal counterclockwise against the action of the spring 18, so that the slat belt is released (shown by solid lines in FIGS. 1 and 3). The rollers 12 and 13 are shown in greater detail in FIG. 2, although the pins 19 are not mounted. Moreover, the magazine 1 includes a further guide roller 22 with a guide groove for each slat belt 2–6.

It will be further apparent from FIG. 1 that an arm 20 is fixedly mounted on the piston rod in the piston and cylinder assembly 11 and serves to maneuver the disk 15 by the intermediary of the pin 19. The piston rod end of the piston and cylinder assembly 11 is connected to the pivotal arm 10 by the intermediary of a joint 21 so that the piston rod 11 may move vertically while the arm 10 pivots.

As has been mentioned above, lateral shifting of the magazine 1 is effected by means of a piston and cylinder assembly 7. To this end, the magazine 1 is carried on rails 23 and 24, via suitable bearings 25 and 26 (FIG. 3).

Figure 2:
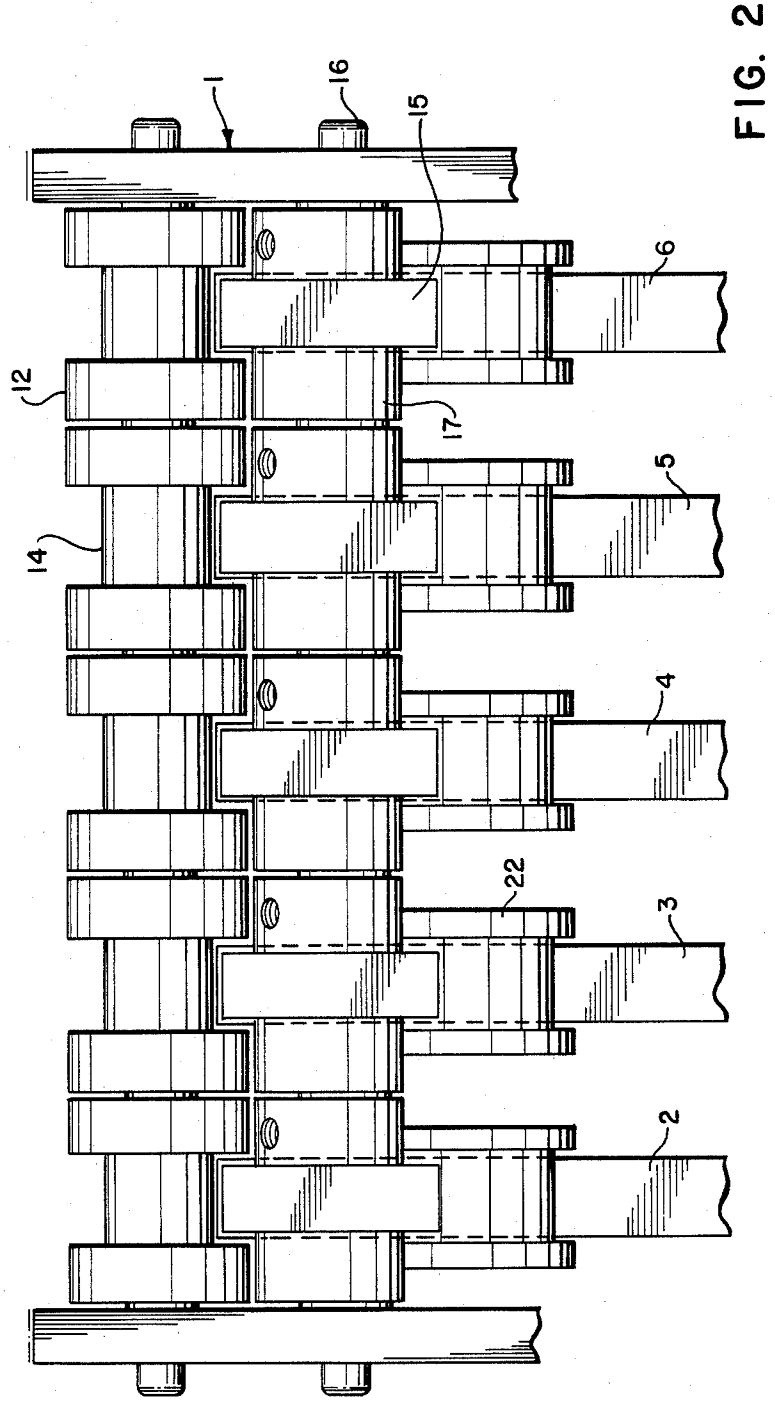
FIG. 2 is a view, in a direction from the machine, of parts of the apparatus of FIG. 1.

FIG. 2 illustrates more closely that the different rollers 12, 13 and 22 consist of parts journaled on a shaft and intended for each slat belt (2–6). This is, naturally, necessary, since the slat belts 3, 4, and 6 must be held fast, while the slat belt 2 is released and fed into the machine by means of the feeding wheel 8 and the urging roller 9.

It is further apparent from FIGS. 1 and 3 that the feeding wheel 8 and the urging roller 9 are located outside the rear of the machine, so that the slat belt 2 (ghosted line) may extend in between the feeding wheel 8 and the urging roller 9 without coming into conflict with any machine parts during lateral shifting of the magazine 1.

The arm 20 is fixedly mounted on the piston rod of the piston and cylinder assembly 11 in such a manner that its position in relation to the joint 21 is adjustable. As a result, it is a relatively simple operation to adjust the position in which the urging roller 9 is to be lifted from the feeding wheel 8 for releasing the slat belt. Naturally, this release operation must not take place until the slat belt 2 is reliably clamped between the bottom of the groove 14 and the periphery of the disk 15. Before this is effected, the slat belt must be backed out of the machine from its last cutting position, and this is effected by rotation of the the feeding wheel 8 clockwise in FIG. 1, while this wheel is rotated counterclockwise for infeed of the slat belt 2 into the machine. By means of position sensors, the slat belt 2 is stopped before its free end 2A has left the nip between the feeding wheel 8 and the urging roller 9, whereby the free end 2A of the slat belts 2–6 will always be located in a suitable position so as to be inserted into the nip between the feeding wheel 8 and the urging roller 9.

The apparatus described in the foregoing is controlled by means of per se known valves, positional sensors and a suitable program. The piston and cylinder assemblies 7 and 11 may suitably be of the hydraulic type, like the motor which drives the feeding wheel 8. The control and regulation equipment requisite for the apparatus according to the present invention is, thus, per se known, and does not constitute any part of the body of the present invention.

We claim:

1. An alternator apparatus for selectively feeding a slat belt to the infeed section of a machine for manufacturing venetian blinds having a plurality of slat belts, said alternator apparatus comprising
   - a magazine disposed at the infeed section of said machine,
   - a plurality of slat belt rolls supported by said magazine for supplying a slat belt to said infeed section from each of said rolls,
   - means for selecting one of said slat belt rolls for supplying a slat belt to said infeed section,
   - and means for reciprocally moving said magazine transversely of said infeed section to supply said slat belt from said selected slat belt roll to said infeed section of said machine.

2. The apparatus as defined in claim 1 wherein said slat belt rolls are supported within said magazine in side-by-side relationship.

3. The alternator apparatus as defined in claim 2 including
   - a pair of infeed rollers (8,9) on said machine at said infeed section for receiving a slat belt therebetween for feeding into said machine,
   - each of said slat belt rolls on said alternator apparatus provided with a guide roller (12) cooperating with a clamping roller (13) for passage of said slat belt therebetween and for fixedly holding said slat belt from one of said slat belt rolls between said rollers (12,13) with the end of each slat belt extending beyond said guide roller (12) and said clamping roller (13) a distance sufficient to enable said slat end to laterally pass between the pair of infeed rollers on said machine as said alternator apparatus is reciprocally moved transversely of said infeed section of said machine, and
   - means for separating said infeed rollers (8,9) for passage of said slat ends therebetween when said alternator apparatus is reciprocally moved transversely of said infeed section.

4. The alternator apparatus as defined in claim 3 wherein said guide roller (12) has a groove (14) disposed therein about its periphery for receiving said slat belt from said slat belt roller therein,
   - said clamping roller (13) including a braking shoe (15) disposed about its perihery for selectively urging said slat belt against the bottom of said groove (14) to fixedly clamp said slat belt in said groove, and
   - means for urging said guide roller and said clamping rollers together whereby said braking shoe urges said slat belt against the bottom of said groove and fixedly clamps said slat belt in said groove.

5. The alternator apparatus as defined in claim 4 wherein said means for urging said guide roller (12) and said clamping roller (13) together comprises a cylinder (17) disposed adjacent to said clamping roller and mounted on the same shaft as said clamping roller, said shaft longitudinally extending through said cylinder at an eccentric position with respect to said cylinder, and
   - a spring (18) connected to said shaft and to said cylinder for biasing said clamping roller (13) and said braking shoe (15) against the bottom of said groove (14) to fixedly clamp said slat belt within said groove.

6. The alternator apparatus as defined in claim 5 including means for rotating said clamping roller (13) and said braking shoe (15) against the biased action of said spring (18) to release said slat belt within said groove and permit movement of said slat belt relative thereto.

7. The alternator apparatus as defined in claim 3 wherein said infeed rollers of the machine include a driven roller and an urging roller for urging said slat belt against said driven roller, said infeed rollers cooperating to feed said slat belt into or out of the machine.

8. The alternator apparatus as defined in claim 1 wherein said infeed rollers of the machine include a driven roller and an urging roller for urging said slat belt against said driven roller, said infeed rollers cooperating to feed said slat belt into or out of the machine.

9. The alternator apparatus as defined in claim 8 wherein said infeed section includes a pivotal arm for supporting said urging roller, and means for pivoting said pivotal arm between a free position when said urging roller is spaced from said driven roller and a driven position when said urging roller engages the slat belt disposed between said urging roller and said driven roller.

10. The alternator apparatus as defined in claim 9 wherein said means for pivoting said pivotal arm comprises a piston and cylinder operative to simultaneously pivot said pivotal arm to move said urging roller away from said driven roller and to release said means acting against the bias action of said spring (18) whereby said spring rotates said clamping roller (13) and braking shoe (15) against the bottom of said groove 14 to fixedly clamp said slat belt within said groove.

11. The alternator apparatus as defined in claim 2 wherein said means for reciprocally moving said magazine includes rails extending transversely of the infeed section of said machine for manufacturing venetian blinds, and actuating means for selectively moving said magazine along said rails to position the end of one of the slat belts extending from one of said guide rollers (12) and clamping rollers (13) between said infeed rollers (8,9).

12. The alternator apparatus as defined in claim 11 wherein said actuating means comprises a piston and a cylinder.

13. The alternator apparatus as defined in claim 3 wherein said infeed rollers cooperate to form a nip therebetween, said nip being located free of the rear portion of said machine so that said end of said slat belt may be movable laterally in relation to the machine through said nip.

* * * * *